US005743150A

United States Patent [19]
Fevre et al.

[11] Patent Number: 5,743,150
[45] Date of Patent: Apr. 28, 1998

[54] SYSTEM FOR GUIDING AND LOCKING A MOTOR VEHICLE STEERING COLUMN

[75] Inventors: Laurent Fevre, Saint-Sulpice; Jean-Christophe Bodin, Saint Ouen, both of France

[73] Assignee: Lemforder Nacam S.A., Vendome, France

[21] Appl. No.: 686,672

[22] Filed: Jul. 26, 1996

[30] Foreign Application Priority Data

Jul. 26, 1995 [FR] France ................ 95 09109

[51] Int. Cl.$^6$ ................................................ B62D 1/18
[52] U.S. Cl. ................................ 74/493; 280/775
[58] Field of Search ........................ 74/493; 280/775

[56] References Cited

U.S. PATENT DOCUMENTS

| 5,139,281 | 8/1992 | Dzioba | 280/775 |
| 5,213,004 | 5/1993 | Hoblingre | 74/493 |
| 5,531,317 | 7/1996 | Tomaru | 74/493 X |
| 5,555,772 | 9/1996 | Schneider | 74/493 |

Primary Examiner—Allan D. Herrmann
Attorney, Agent, or Firm—Young & Thompson

[57] ABSTRACT

Steering column for a motor vehicle and comprising a body (1), a fixed portion (2) rigidly linked to the frame of the vehicle and a mobile portion (3) rigidly linked to the body (1). The column also comprises a fixed notched element (70) integral with a bracket (21) of the fixed portion (2), a mobile notched element (71) connected to the mobile portion (3), and fixing elements (51, 52, 53, 54, 55) making it possible to render integral the mobile (3) and fixed (2) portions in a locked position in which the notches (80, 90) of the two notched elements (70, 71) cooperate by shape mating. An elastic device (72) is provided between the fixed (70) and mobile (71) notched elements, causing the elements (70, 71) to be moved apart from each other, when the fixing elements (51, 52, 53, 54, 55) are inactivated and thus allowing to unlock the link between the fixed (2) and mobile (3) portions.

11 Claims, 4 Drawing Sheets

SYSTEM FOR GUIDING AND LOCKING A MOTOR VEHICLE STEERING COLUMN

FIELD OF THE INVENTION

The present invention relates to motor vehicle steering columns. It relates more particularly to such a column equipped with a guiding and locking system.

BACKGROUND OF THE INVENTION

So as to provide the driver of a car with more comfort and ease of steering, modern steering columns are provided with systems adapted to adjust the height and depth of the steering wheel.

This adjustment system poses problems of maintaining the column body should an impact occur. The axis of the column may then suddenly be deviated because of the height-adjustment device. This situation is dangerous for the driver and also reduces the effectiveness of the energy absorption means equipping the column and/or the vehicle.

This aspect is even more important when an inflatable air bag is used. This type of device significantly contributes in reducing the seriousness of the impact by distributing as much as possible the force of the steering wheel on the thorax of the driver. However, so as to be fully effective, it needs to be accompanied by a keeping of the column axis in the selected position.

It is therefore highly desirable that the adjustment system is combined with column maintaining means.

Devices have already been provided to try to find a solution to this problem. In one of them, a mobile portion rigidly linked to the column body is guided with respect to a fixed portion rigidly linked to the frame of the vehicle and fixing means make it possible to render the two portions integral, by applying pressures.

However, devices of this type prove to be inadequate to resist high stresses, especially at the time of an impact.

Another guiding device with locking has been disclosed in the document FR-2.599.697. It describes a receiving device supporting the steering column, by means of a support shaft passing through two receiving plates integral with the frame and placed opposite each other laterally with respect to the column body. The body is depth and height-adjustable, along elongated holes made in the receiving plates. These receiving plates comprise rectangular openings and are respectively associated with two stop plates provided respectively with two orthogonal elongated holes. The receiving plates and the stop plates are provided with mutually gearing teeth which ensure locking of the column when the elements are tightened against each other, along the support shaft.

The drawback of this device resides in the fact that it cannot reliably ensure unlocking of the positioning system. However, it is essential to carry out this unlocking so as to be adapted to guide the column body when the latter is adjusted.

The document EP-A-0.529.769 discloses a locking device for an adjustable steering column assembly. This device comprises a first disk and a second disk with one being engaged in the other, each being fitted with toothed zones passing through windows of the other disk. The toothed zones of one of the two disks are engaged in a toothed zone of a mounting support integral with the frame, while the toothed zones of the second disk are engaged in a toothed form integral with the column body. A spring is inserted between the two disks so as to separate them, making it possible to retract the toothed zones in the corresponding windows and thus to disengage them.

The document EP-A-0.600.700 relates to a steering column locking mechanism.

The document GB-A-2.279.728 discloses an antifriction element mounted between sliding components of an adjustable steering column.

OBJECTS OF THE INVENTION

The object of the present invention is a system for guiding and locking a steering column, said system combining a resistant locking with an easy guiding of the column body.

Another object of the invention is to make it possible to have the column move from a locked position to an unlocked position and vice versa, by means of a simple and inexpensive embodiment with an equally simple and inexpensive assembling method.

Another object of the invention is a system for guiding and locking a motor vehicle steering column with which an inflatable air bag is associated, this system ensuring that the column is kept in its axial direction should an impact occur, while permitting to easily modify this direction so as to adapt it to the needs of the driver. A correct positioning of the air bag, i.e. substantially in the axis of the column and at the level of the thorax of the driver, may thus be ensured despite significant stresses.

SUMMARY OF THE INVENTION

The invention is applicable to a motor vehicle steering column comprising:

a column body extending substantially in the longitudinal direction of the vehicle, a fixed portion rigidly linked to the frame of the vehicle and including two first brackets situated on each side of the column body, a mobile portion rigidly linked to the column body and including two second lateral brackets cooperating respectively with the first brackets, so that the mobile portion can have a movement which is limited with respect to the fixed portion, and a guiding and locking system for positioning and fixing the mobile portion with respect to the fixed portion.

This guiding and locking system comprises:

at least one fixed notched element integral with one of the brackets of the fixed portion, at least one mobile notched element connected to the mobile portion and disposed opposite the fixed element, fixing means adapted to render integral the mobile and fixed portions in a locked position, in which the notches of the two elements cooperate by shape mating.

According to the invention, an elastic means is provided between the notched fixed and mobile elements, so as to be compressed by the fixing elements in the locked position and to cause these elements to be separated from each other when the fixing elements are inactivated, which corresponds to an unlocked position in which the mobile portion is adapted to move with respect to the fixed portion.

The presence of an elastic means inserted between the fixed and mobile elements ensures that, when the pressure exerted to lock the column body ceases being applied, a sufficient play is automatically generated between the notched elements and renders possible their relative movement without being impeded. Locking security is thus provided together with the facility of positioning guiding.

In a first preferred embodiment of the steering column, at least one of the fixed elements comprises at least one track extending in a direction substantially parallel to the direction of movement of the mobile portion with respect to the fixed portion. The elastic means then comprises at least one bracket adapted to slide on this track and is integral with the mobile element associated with this fixed element. In this way, the elastic means ensures both the function for elastically separating the notched elements from each other and the functions for guiding and orientating these elements with respect to one another.

By virtue of this triple function for guiding, orientating and separating, the elastic means plays an essential part in the proper functioning of the guiding and locking system. Its action makes it possible for the mobile portion to slide into the fixed portion without the need for external intervention, with a control of the adjustment direction.

In this first preferred embodiment, the track is disposed along a flat surface and is advantageously bordered by at least one edge slanting with respect to this flat surface, thus constituting a guiding surface.

Secondly, the mobile element advantageously comprises at least one recess and the elastic means comprises a tongue adapted to be inserted in this recess, this insertion making it possible to render the mobile element integral with the elastic means and to provide it with an accurate positioning with respect to the fixed element.

In a second advantageous embodiment of the steering column, it includes means for positioning in rotation the fixed elements with respect to the elastic means, and at least one of the mobile elements comprises at least one track extending in a direction of movement of the mobile portion with respect to the fixed portion. The elastic means comprises at least one bracket adapted to slide on this track, and the guiding and locking system comprises means for supporting this mobile element against the elastic means in the unlocked position. Thus, as in the first embodiment, the elastic means fulfils both the elastic spacing function and that for guiding these elements with respect to one another.

According to a preferred embodiment of the invention, the fixing means include a rod extending in a direction transverse to the column axis by passing through openings of the fixed and mobile portions. Tightening members are disposed at each of the extremities of the rod and, when actuated, they allow tightening the brackets of the fixed portion against the adjacent brackets of the mobile portion.

This embodiment can further comprise the following characteristics, either separately or combined:

the openings of the fixed portion have an elongated shape, the rod sliding in these openings in the unlocked position, thus driving the mobile portion, and being immobilized in the locked position corresponding to the intermeshing of the notched elements.

the openings of the mobile portion have an elongated shape, at least one of the mobile elements is fixed to one of the rod extremities, the corresponding fixed element and the bracket of the fixed portion being inserted between this mobile element and one of the brackets of the mobile portion.

In an embodiment corresponding to this latter mounting, with the rod being a screw and the tightening members comprising a nut, this nut preferably cooperates with the mobile element, with the an antifriction means interposed therebetween.

The antifriction means is advantageously a washer, formed of or coated with an antifriction material, or even a ball or needle bearing.

The antifriction means may also be an element having a shape other than that of a washer (rectangular, oval, polyhedral, etc.) formed of or coated with an antifriction material.

Again in this preferred embodiment, the tightening members may comprise a cam, a counter-cam and an operating lever, disposed at one of the two rod extremities, the notched elements being disposed at the other extremity. The cam and the counter-cam can be made to cooperate under the action of the operating lever, so as to make the column move from the unlocked position to the locked position and vice versa.

In the steering column of the invention, it is advantageous that blocks be inserted between the adjacent brackets of the fixed and mobile portions.

The vehicle is preferably equipped with an inflatable air bag which is activated should an impact occur and dampens the impact of the driver on the steering wheel and the column.

The steering column of the invention is advantageously also provided with an energy absorption device in the event of an impact occurring.

The height-locking of the steering column allows ensuring that its axis keeps a fixed direction should an impact occur. This directional stability makes it possible to accurately adjust the energy absorption force due to a movement of the struck column.

BRIEF DESCRIPTION OF THE DRAWING

There now follows a description of non-restrictive embodiment examples of the present with reference to the accompanying drawings, in which.

DESCRIPTION OF THE PREFERRED EMBODIMENTS

Figure 1:
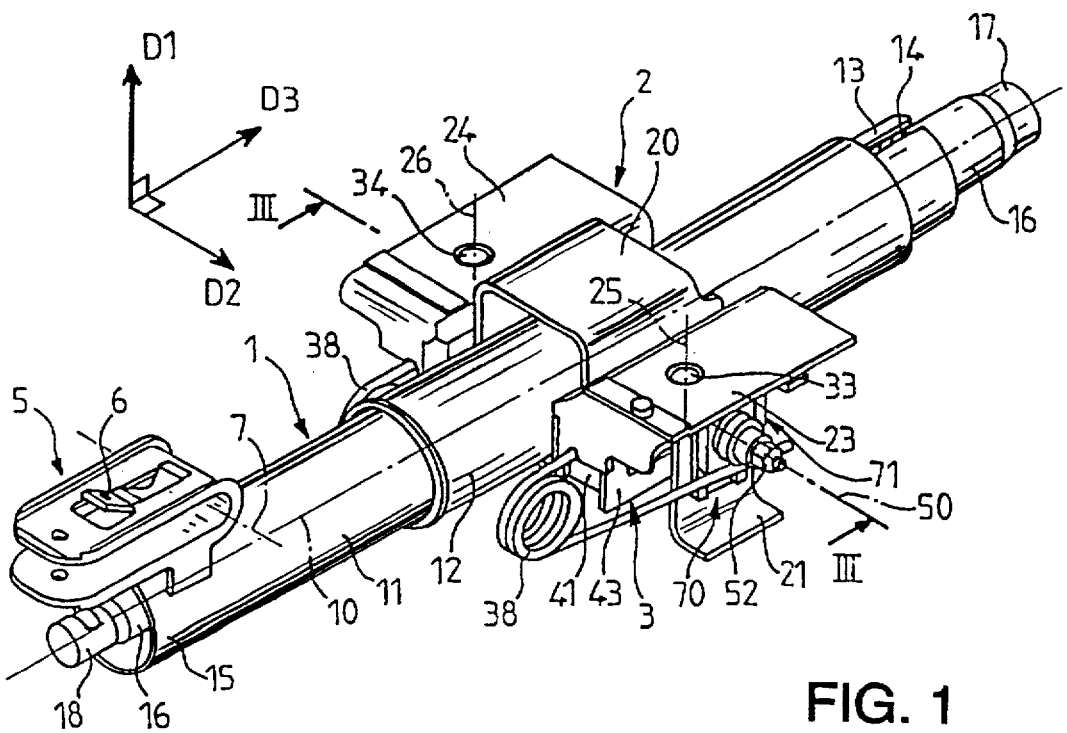
FIG. 1 is a first perspective view of a steering column with a guiding and locking system according to the invention.

The same reference numerals on the drawings are used to denote identical elements.

Figure 2:
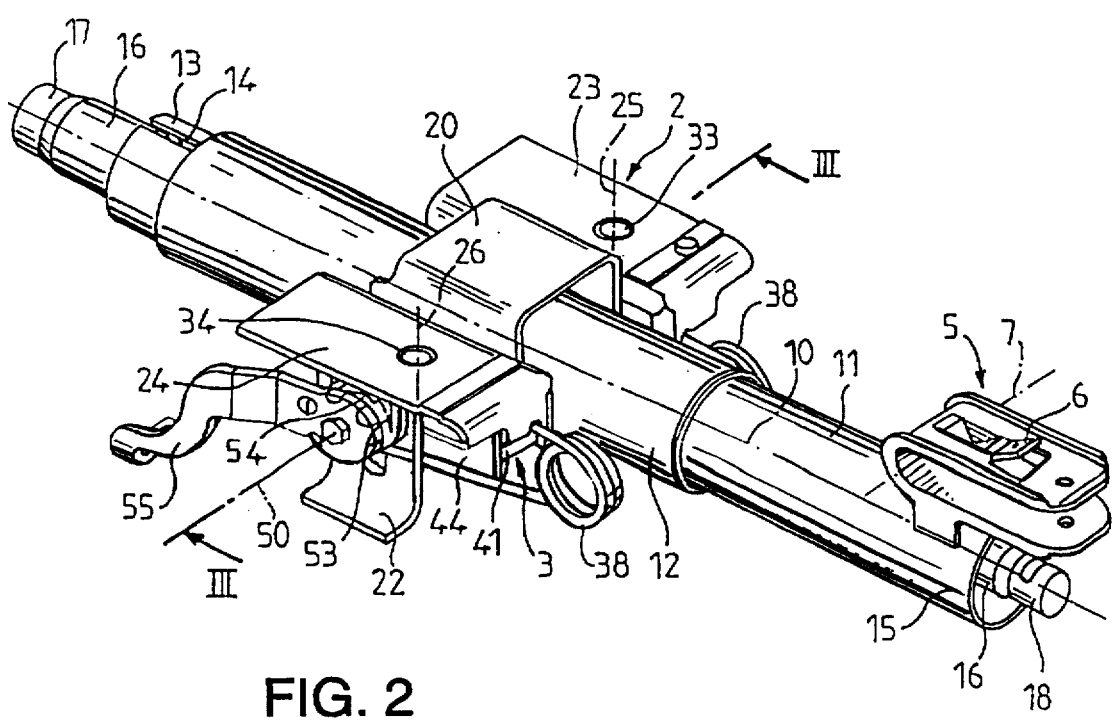
FIG. 2 is another perspective view of the steering column shown in FIG. 1.

The motor vehicle steering column shown in FIGS. 1 and 2 includes a body 1 with an axis 10. This axis 10 is orientated substantially in the longitudinal direction of the vehicle and slanted with respect to the horizontal by an angle, usually of between 20° and 30°. The body 1 contains a transmission rod 16 connected to the steering wheel (not shown), via its rear extremity 17, and to the steering transmission (not shown), via its front extremity 18. The rear extremity 17 of the rod 16 is advantageously equipped with an inflatable air bag intended to distribute the forces due to a possible impact on the driver.

For the remainder of the text, the terms < rear > and < front > shall be used with reference to the rear and the front of the vehicle, respectively.

At its rear extremity, the column body 1 comprises a switch fixing element 13 (not shown). This element 13 is entirely optional for the requirements of the present invention. It has only been shown to illustrate the entire mounting of a column so that it can be used practically. In this example, the element 13 is provided with a slot 14 parallel to the axis 10, which permits the element 13 to be angularly orientated about the axis 10.

Via its front extremity 15, the column body 1 cooperates with the steering transmission through an articulation system 5. This articulation system 5 allows a rotation about a rotation axis 7 which is horizontal and perpendicular to the column axis 10, by means of a lever 6.

In the embodiment example shown in FIGS. 1 and 2, the body 1 is telescopic and includes an inner tube 11 nested in an outer tube 12, the outer tube 12 being adapted to slide on the inner tube in the direction of the column axis 10 at the time of a depth adjustment.

The column body 1 is rigidly linked to a mobile portion 3. This mobile portion 3 comprises a reinforcement square 40, visible on FIGS. 3 and 4, stiffened by a crossmember 41 on which the body 1 rests. The outer tube 12 of the body 1 is rigidly linked to the reinforcement square 40 by means of welding or crimping. The reinforcement square 40 is fitted with two brackets 43 and 44 orientated substantially vertically on both sides of the column body 1.

The mobile portion 3 can be adjusted with respect to a fixed portion 2.

This fixed portion 2 includes a support 20 fitted with two substantially vertical brackets 21 and 22, situated on both sides of the column body 1 and respectively associated with the brackets 43 and 44 of the reinforcement square 40.

The support 20 is also fitted with two wings 23 and 24 substantially horizontal, situated on both sides of the column body 1 and rigidly linked to the frame of the vehicle. The wings 23 and 24 are fixed to the frame along respective fixing axes 25 and 26 perpendicular to the column axis 10 and situated in vertical planes, passing through respective circular holes 33 and 34 made in the wings 23 and 24. The fixing elements are typically screws engaging in tappings situated on the frame.

Mounting with a reinforcement square and a support is only one possible embodiment example. It can be replaced by any other means adapted to connect the body 1 to the frame of the vehicle.

According to an alternative embodiment, the unit constituted by the outer tube 12 and the reinforcement square 40 can be formed in one single piece and made, for example, from foundry-cast aluminium or magnesium.

The mobile portion 3 driving the column body 1 can be positioned with respect to the fixed portion 2 by means of a guiding and locking system. The fixed 2 and mobile 3 portions are interconnected along a positioning transverse axis 50 passing through the brackets 21 and 22 of the support 20 and the brackets 43 and 44 of the reinforcement square 40. The transverse axis 50 is perpendicular to the axis 10 of the column body 1.

Two return springs 38 known per se are provided laterally on both sides of the body 1 so as to balance the weight of the steering wheel at the time of adjustment operations. Each of them is attached, at a first fixed extremity, to a hooking element disposed under the corresponding wing 23, 24 and integral with the fixed portion 2. Its second mobile extremity ends around the transverse axis 50 on the corresponding side of the body 1. Each of the springs 38 includes a median portion forming convolutions which form a counterweight for the steering wheel.

Figure 3:
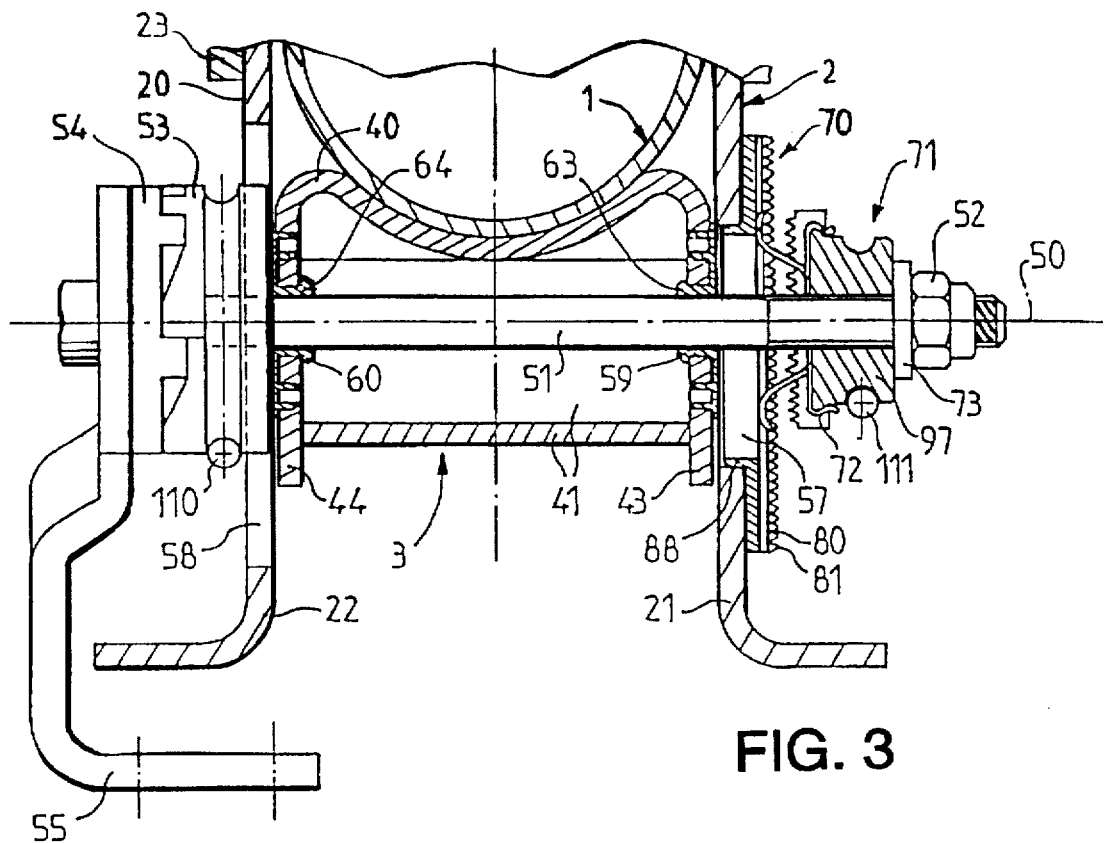
FIG. 3 is a partial sectional view along III—III of FIGS. 1 and 2 in an unlocked position.
Figure 4:
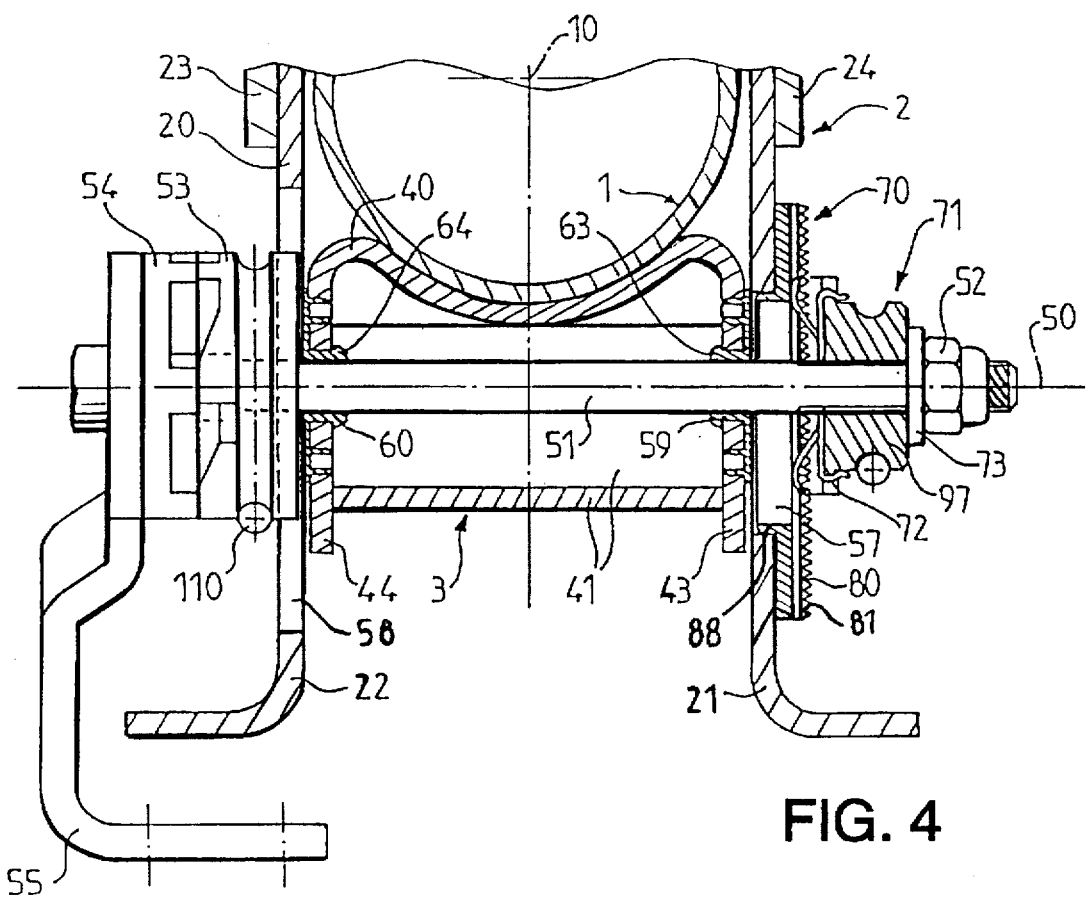
FIG. 4 is a sectional view similar to FIG. 3 in a locked position.
Figure 5A:
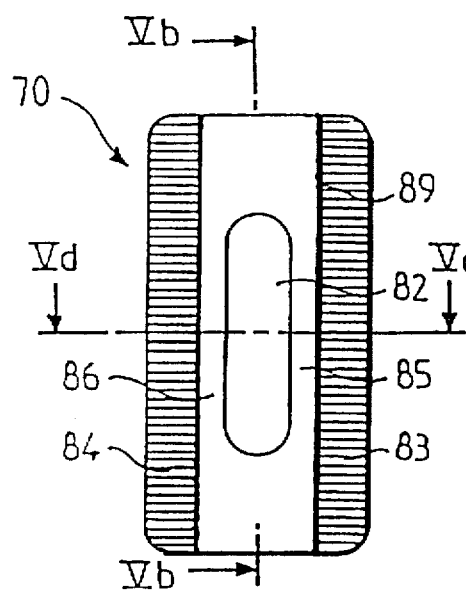
FIG. 5a, 5b, 5c and 5d are respectively top, lateral sectional (along Vb—Vb) bottom and transverse sectional (along Vd—Vd) views of the fixed notched element corresponding to FIGS. 1 to 4.
Figure 5B:
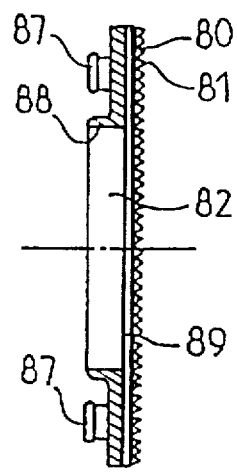
Figure 5C:
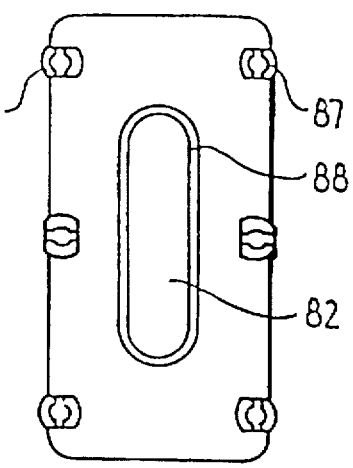
Figure 5D:
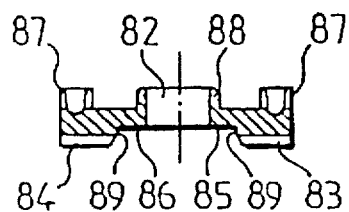

The guiding and locking system includes a positioning screw 51 associated with a nut 52 (FIGS. 3 and 4). The screw 51, directed along the transverse axis 50, passes through elongated openings 59 and 60 of the brackets 43 and 44 of the reinforcement square 40, parallel to the column axis 10. It also passes through elongated openings 57 and 58 of the brackets 21 and 22 of the support 20, perpendicular to the axis 10.

These elongated openings 57, 58, 59, 60 have a function for guiding the screw 51 while imposing stops for the extreme adjustment positions.

The extremity of the screw 51 opposite the nut 52 is connected to a cam 53 and to a counter-cam 54. The locking system also includes an operating lever 55 cooperating with the counter-cam 54 and adapted to activate it on rotation. The cam 53 and counter-cam 54 can be caused to cooperate under the action of the operating lever 55, so as to tighten or untighten the elements disposed along the transverse axis 50. The lever 55 is thus adapted to control movements for bringing closer or spacing apart these elements and to exert pressures between the brackets 21, 22 corresponding to the associated fixed portion 2 and those 43, 44 corresponding to the associated mobile portion 3 respectively. The cam 53 also guides the screw 51 with respect to the fixed portion 2.

The elongated holes 50, 60 of the brackets 43, 44 of the reinforcement square 40 have stops limiting the travel of the screw 51 along the axis 10.

Blocks 63 and 64 are inserted between the adjacent brackets 21, 22, 43, 44 of the fixed 2 and mobile 3 portions and are traversed by the screw 51. These blocks 63, 64 constitute adherence surfaces in the locking position. They also contribute in guiding the brackets 43 and 44 of the reinforcement square 40 with respect to those 21 and 22 of the support 20.

The length of the blocks 63, 64, in a direction parallel to the column axis 10 determines the depth-travel of the screw 51.

The guiding and locking system also includes a fixed notched element 70 mounted on the bracket 21 of the support 20 and traversed by the transverse axis 50. A mobile notched element 71, placed on the screw 51 on the side of the nut 52, is disposed opposite this fixed element 70 outside with respect to the column body 1.

In accordance with the invention, an elastic means in the form of a spring 72 is disposed between the elements 70 and 71.

The cam 53 and the mobile notched element 71 are provided with circular hollows 110 and 111 respectively. These hollows 110 and 111 are intended for passage of the return springs 38.

An antifriction washer 73 is inserted between the nut 52 and the mobile notched element 71.

The fixed notched element 70, shown on FIGS. 5a, 5b, 5c and 5d, has a substantially rectangular shape. It comprises a longitudinal elongated hole 82. Along edges situated on both sides of this elongated hole 82, the element 70 includes two sets of teeth 83 and 84 consisting of an alternation of notches 80 and teeth 81, orientated perpendicular to the direction of the elongated hole 82. Tracks 85 and 86 disposed along the plane of the fixed element 70 are provided between the hole 82 and respectively the sets of teeth 83 and 84. A slight offsetting between the tracks 85, 86 and the sets of teeth 83, 84 reveals the edges 89 perpendicular to the plane of the fixed element 70 and parallel to the direction of the elongated hole 82.

The notched element 70 is connected to the bracket 21 by a projecting element 88 inserted in the opening 57 and by fixing dog points 87. The opening 57 is thus located opposite the elongated hole 82 and is larger than the latter.

Figure 6A:
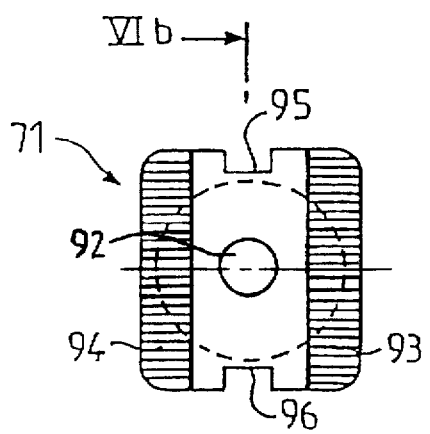
FIGS. 6a, 6b and 6c are respectively top, lateral sectional (along VIb—VIb) and bottom views of the mobile notched element corresponding to FIGS. 1 to 4.
Figure 6B:
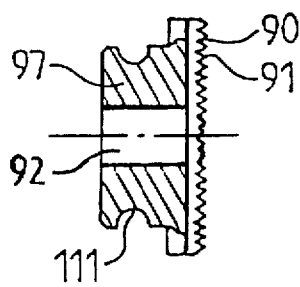
Figure 6C:
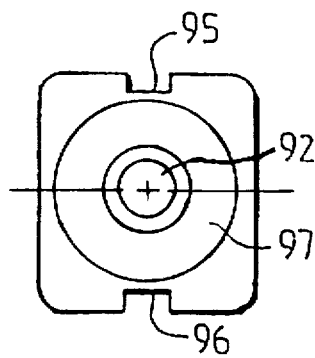

The mobile notched element 71 shown in FIGS. 6a, 6b and 6c has a substantially square shape. It comprises a circular hole 92 for passage of the screw 51. Parallel sets of teeth 93 and 94 are disposed on both sides of this hole 92. They comprise an alternation of notches 90 and teeth 91 orientated perpendicular to the direction of the sets of teeth 93 and 94. Recesses 95 and 96 are made on opposing edges, between the sets of teeth 93 and 94.

The mobile element 71 also comprises a substantially cylindrical body 97 with a circular section on the side opposite the notches 90. This relatively bulky body 97 has the previously mentioned circular hollow 111.

Figure 7A:
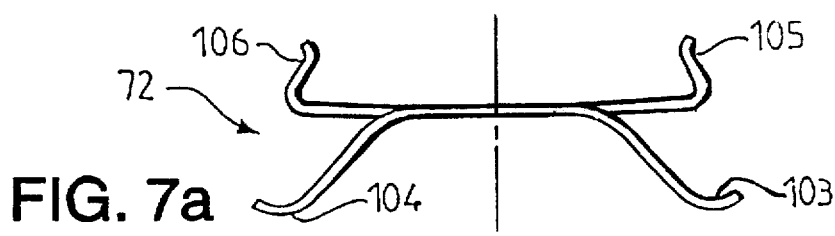
FIGS. 7a and 7b are respectively lateral and top views of the spring constituting the elastic means of the column of FIGS. 1 to 4.
Figure 7B:
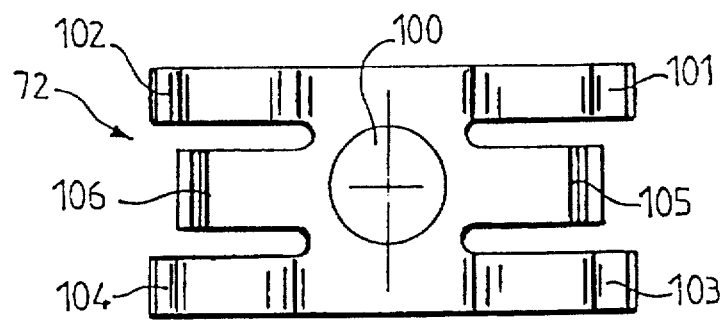
Figure 8A:
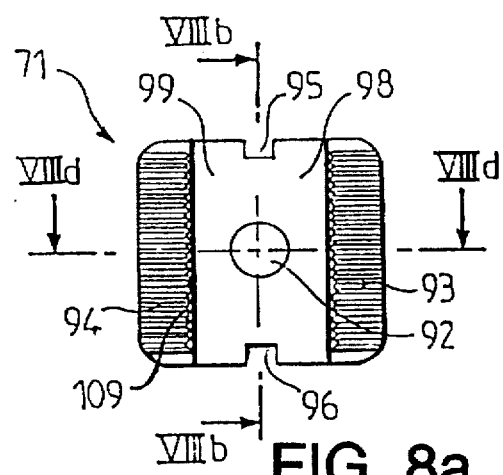
FIGS. 8a, 8b, 8c and 8d are respectively top, lateral sectional (along VIIIb—VIIIb), bottom and transverse sectional (along VIIId—VIIId) views of, an alternative embodiment of the mobile notched element shown in FIGS. 6a, 6b and 6c.
Figure 8B:
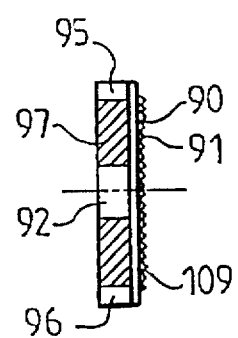
Figure 8C:
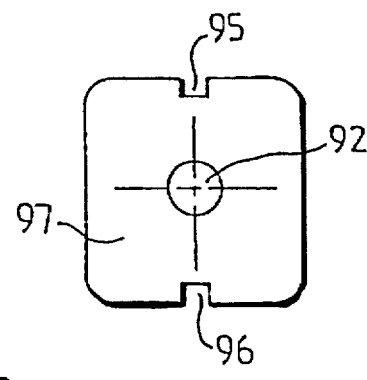
Figure 8D:
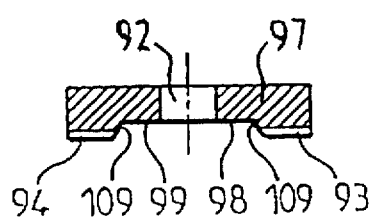

The spring 72 shown in FIGS. 7a and 7b comprises a circular hole 100, four brackets 101, 102, 103 and 104 situated on a first side of its surface at its four corners and two tongues, 105 and 106, situated on the second side of its surface on opposing sides. Projected onto a plane parallel to this surface, as shown in FIG. 7b, the tongue 105 extends between the brackets 101 and 103 and the tongue 106 between the brackets 102 and 104.

When in position, as shown in FIGS. 3 and 4, the brackets 101 and 102 of the spring 72 are placed on the track 85 of the element 70 and its brackets 103 and 104 on the track 86. The brackets 101, 102, 103 and 104 are adapted to slide along the tracks 85 and 86. The tracks 85 and 86 make it possible to accurately position in rotation the spring 72 around the transverse axis 50 with respect to the fixed notched element 70. Secondly, they constitute a support for the spring 72 so as to embody the spacing apart of the elements 70 and 71. Finally, they perform a rubbing function of the spring 72 against the fixed element 70. This rubbing makes it possible to maintain a slight residual tension in the guiding and locking system, along the screw 51, this tension preventing small movements or vibrations likely to generate noises.

Secondly, the edges 89 guide the brackets 101, 102, 103, 104 in their translation movement. The width of the tracks 85, 86, as measured in the plane of the fixed element 70 in a direction perpendicular to the direction of the elongated hole 82, is just slightly larger than that of the brackets 101, 102, 103, 104, so as to generate a small amount of play. This play facilitates the movement of the spring 72 on the fixed element 70 without adversely affecting the relative orientation of these two elements.

The tongues 105 and 106 of the spring 72 are respectively fixed in the recesses 95 and 96 of the mobile element 71. These recesses 95 and 96 thus ensure an accurate positioning in rotation of the mobile element 71 around the transverse axis 50 with respect to the spring 72. Furthermore, the tongues 105, 106 make it possible to render the spring 72 and mobile element 71 integral with each other, which facilitates assembling operations by reducing handlings.

The spring 72, positioned between the elements 70 and 71, thus fulfils both a function for spacing apart these elements 70 and 71 and a function for accurately positioning these elements in rotation with respect to each other, around the transverse axis 50. This results in the teeth 81 and 91 of the fixed 70 and mobile 71 notched elements, respectively, remaining always parallel, even when the two notched elements 70, 71 are moved apart from each other. This accurate positioning guarantees a good gearing of the sets of teeth 83, 84 and 93, 94 respectively, thus allowing for a satisfactory functioning of the guiding and locking system.

The screw 51 passes through the opening 57, the elongated hole 82 of the fixed element 70, the circular hole 100 of the spring 72 and the circular hole 92 of the mobile element 71.

During operation, the steering column can take two positions. In a first position or unlocked position shown in FIG. 3, the mobile portion 3 is adapted to move with respect to the fixed portion 2. In a second position or locked position shown in FIG. 4, the fixed 2 and mobile 3 portions are immobilised with respect to each other.

In the unlocked position, the cam 53 and counter-cam 54 system is released by means of the operating lever 55. A play then exists along the screw 51. This play is for the most part carried forward between the notched elements 70 and 71 by virtue of the spacing apart action exerted by the spring 72. It is sufficient for the teeth 81 of the fixed notched element 70 to no longer have any contact with the teeth 91 of the mobile notched element 71. The sets of teeth 83, 84, 93 and 94 of the elements 70 and 71 thus no longer are any obstacle to the relative movements of these elements 70 and 71.

The release of the cam 53 and counter-cam 54 system also renders nil or slight the pressures exerted by the brackets 21 and 22 of the support 20. The absence of adherence between the support 20 and the reinforcement square 40 does not therefore prevent movements of the mobile portion 3 with respect to the fixed portion 2.

In this unlocked position, the reinforcement square 40 can thus move in a direction D3 (see FIG. 1) parallel to the axis 10 of the column body 1, by virtue of the elongated openings 59 and 60 parallel to this direction D3 and encompassing the screw 51. The reinforcement square 40 when moving thus drives the entire mobile portion 3. The screw 51, immobilised by the elongated openings 57, 58 and 82 perpendicular to the direction D3, then keeps the mobile element 71 in position. Thus, a depth guiding is obtained, the outer tube 12 sliding on the inner tube 11.

The mobile portion 3 can also be moved parallel to a direction D1 perpendicular to the axis 10 and contained in a vertical plane. The movement along the direction D1 is obtained by means of a vertical movement of the screw 51 in the elongated openings 57 and 58 made in the brackets 21 and 22 of the support 20. The blocks 63 and 64, inserted between the support 20 and the reinforcement square 40, contribute in guiding the screw 51. The cam 53 also provides this function. When moving, the screw 51 drives the entire mobile portion 3, as well as the mobile notched element 71. The relative movement of this element 71 with respect to the fixed notched element 70 is controlled by the spring 72, which is integral with the element 71 via its tongues 105 and 106 and whose brackets 101, 102, 103 and 104 slide on the tracks 85 and 86 provided on the element 70 and parallel to the direction D1. Thus, a height-guiding is obtained, the column body 1 undergoing a slight rotation of a few degrees about the rotation axis 7 by means of the articulation system 5.

In the unlocked position, the absence of adherence, or the slight adherence, between the support 20 and the reinforcement square 40 and the automatic spacing apart of the fixed 70 and mobile 71 elements by virtue of the spring 72 make it possible to carry out guidings without requiring any additional means to be used.

During adjustment operations, the axis 50 of the screw 51 remains permanently parallel to a direction D2 which is horizontal and perpendicular to the directions D1 and D3.

Once the column body 1 is adjusted in the selected position, it is locked and the column is placed in the locked position.

This locking is obtained via a rotation of the control lever 55 which causes the cam 53 and counter-cam 54 to cooperate so as to create a tension in the screw 51. The nut 52 associated with the screw 51 enables this tension to be adjusted, the antifriction washer 73 avoiding any significant rubbing between the nut 52 and the body 97 of the mobile notched element 71.

The tightening of the cam 53 and counter-cam 54 generates significant pressures between the brackets 21 and 22 of the support 20 and the brackets 43 and 44 of the reinforcement square 40 respectively. The blocks 63 and 64 reinforce adherence between these brackets 21, 22, 43 and 44. The mobile portion 3 is thus locked with respect to the fixed portion 2.

This locking is considerably reinforced by the intermeshing of the fixed 70 and mobile 71 notched elements. The cam 53 and counter-cam 54 system in fact imposes a drawing together of the two elements 70 and 71 and a compression of the spring 72. The cooperation of the brackets 101, 102, 103 and 104 of the spring 72 with the tracks 85 and 86 of the fixed element 70, and of its tongues 105 and 106 with the recesses 95 and 96 of the mobile element 71, ensure an accurate angular holding of the element 71 with respect to the element 70, thus allowing a correct meshing of the sets of teeth 83 and 84 of the fixed element 70 with the sets of teeth 93 and 94, respectively, of the mobile element 71.

The presence of the sets of teeth 83, 84, 93, 94 substantially increases the retaining force of the mobile portion 3 in the fixed portion 2, as compared with a simple adherence locking. This force is thus multiplied by three to five. The steering column is then adapted to resist a force of more than 3,000N in the direction D1, and up to 10,000N.

An alternative embodiment of the mobile notched element 71 is shown in FIGS. 8a, 8b, 8c and 8d. The elements similar to those of the preceding embodiment are allocated with the same reference signs. The body 97 is also cylindrical with a circular section, but is substantially less deep than in the preceding embodiment. It does not have any hollow for passage of the return springs 38.

In this variant, the mobile notched element 71 comprises tracks 98 and 99 disposed between the circular hole 92 and the sets of teeth 93 and 94 respectively, similar to those 83 and 84 provided for the fixed notched element 70 and fulfilling the same function. A slight offsetting between the tracks 98, 99 and the sets of teeth 93, 94 also reveals edges 109 perpendicular to the plane of the mobile notched element 71 and parallel to the direction of the tracks 98, 99.

In a corresponding way, the spring 72 comprises four additional brackets which are symmetrical with respect to its surface of the four brackets 101, 102, 103, 104 already existing and intended to come into the tracks 98, 99 of the mobile notched element 71. When in position, these brackets are adapted to slide along the tracks 98 and 99 and their translation movement is guided by the edges 109. A play similar to the one provided for the fixed notched element 70 facilitates the movement of the spring 72 on the mobile element 71. The tongues 105 and 106 and the recesses 95 and 96 are thus used to solely fix the spring 72 to the mobile notched element 71, the positioning in rotation being ensured by the tracks 98, 99 and the corresponding brackets of the spring 72.

In the unlocked position, the mobile notched element 71 is driven, in a translation movement along one of the directions D1 or D3, by the screw 51 passing through its circular hole 92. It remains accurately positioned in rotation with respect to the fixed notched element 70, as a result, on the one hand, of inserting tongues 105 and 106 into the recesses 95 and 96 and, on the other hand, of placing the corresponding brackets of the spring 72 on the tracks 98 and 99.

Without interfering with the functioning of the system, these tongues 105, 106 and recesses 95, 96 can be suppressed, the screw 51 ensuring in the unlocked position the keeping of the corresponding brackets of the spring 72 against the tracks 98 and 99.

The return springs 38 can be replaced by any other means adapted to balance the weight of the steering wheel during adjustment manoeuvres.

Although the cam 53 and counter-cam 54 system constitutes a preferred solution in the locking system, it can be replaced by any other locking system. A screw/nut assembly or a toggle lever system may thus be suitable.

The support 20 with the reinforcement square 40 can be replaced by any other element, such as a tubular element, adapted to accommodate and maintain the column body 1.

The vertical orientation of the brackets 21, 22, 43, 44 is an advantageous embodiment for reasons of compactness, but is not essential. These brackets could also be orientated obliquely or even have elbows and cooperate in a horizontal plane.

As for the wings 23, 24, these can have any shape other than those given by way of examples and may even be replaced by simple fixing projections.

Instead of teeth 81 and 91 orientated parallel to the direction D3 of the column axis 10, notches of any shape can be provided on the elements 70 and 71. The important thing is that the notched elements 70 and 71 cooperate by shape mating. The longitudinal shape of the teeth 81, 91 and the notches 80, 90 does, however, generate a significant resistance in the direction D1 and is thus particularly advantageous.

Secondly, the fixed 70 and mobile 71 notched elements can assume shapes other than the substantially rectangular shapes shown in the embodiment examples, such as circular or polygonal shapes. The body 97 of the mobile notched element 71 may also assume a shape other than the circular cylindrical one preferably selected, such as a conical or polygonal shape. Moreover, it can be of any depth parallel to the screw 51.

In the example put forward, the tracks 85, 86 of the fixed notched element 70 are disposed along a flat surface, with the edges 89 adapted to guide the brackets 101, 102, 103, 104 of the spring 72. It is quite possible to give the tracks 85, 86 inclinations other than the one corresponding to the plane of the fixed element 70. They may thus respectively define two flat surfaces parallel to the direction of the elongated hole 82 and symmetrical with respect to the latter. The tracks 85, 86 can more generally also constitute non-flat surfaces. For example, these may have cylindrical shapes with a circular base having axes parallel to the direction of the elongated hole 82. The presence of edges 89 is then no longer necessary, the tracks 85, 86 also having a guiding function. In these various cases, the brackets 101, 102, 103, 104 have shapes complementary to those of the associated tracks 85, 86.

While remaining within the scope of the claimed invention, it is possible to replace the elongated hole 82 of the fixed notched element 70 by a circular hole adapted to enclose the screw 51, and to replace the circular hole 92 of the mobile notched element 71 with an elongated hole having a direction parallel to that of the sets of teeth 93 and 94. The functions of the two notched elements 70 and 71 are then inverted: at the time of a relative movement of the fixed 2 and mobile 3 portions along the direction D1, the screw 51 remains integral with the fixed portion 2, whereas the mobile notched element 71 integral with the mobile portion 3 is positioned vertically by sliding onto the screw 51.

The guiding and locking system described for a depth and height adjustable column can be used similarly for a column adjustable in height only.

The reinforcement of locking of the mobile portion 3 in the direction D1 is particularly appropriate as it makes it possible to maintain the axial direction of the column body 1 if an impact occurs. It is possible to equip the depth-adjustment with a device formed of notched elements, so as to guarantee improved retaining of depth positioning.

The invention proves to be particularly advantageous when the column is equipped with an inflatable air bag. In fact, the locking as obtained by the invention makes it possible to guarantee maintaining the direction of the column at the time of an impact.

The purpose of the reference signs inserted following the technical characteristics mentioned in the claims is only to facilitate understanding of the latter and does not restrict their scope.

We claim:

1. Motor vehicle steering column comprising:

a column body extending substantially in the longitudinal direction of the vehicle, a fixed portion rigidly linked to the frame of the vehicle and including two first brackets situated on each side of the column body, a mobile portion rigidly linked to the column body and including two second lateral brackets cooperating respectively with the first brackets so that the mobile portion can have a movement which is limited with respect to the fixed portion, a guiding and locking system for positioning and fixing the mobile portion with respect to the fixed portion, said guiding and locking system comprising:

at least one fixed notched element integral with one of the brackets of the fixed portion, at least one mobile notched element connected to the mobile portion and disposed opposite the fixed element, fixing means adapted to render integral the mobile and fixed portions in a locked position in which the notches of the two notched elements cooperate by shape mating, said steering column further including an elastic means being provided between said notched fixed and mobile elements, so as to be compressed by the fixing means in the locked position and to cause said notched elements to be spaced from each other when the fixing means are inactivated, which corresponds to an unlocked position in which the mobile portion is adapted to move with respect to the fixed portion, said at least one fixed notched element comprising at least one track extending in a direction substantially parallel to the direction of movement of the mobile portion with respect to the fixed portion and said elastic means comprising at least one bracket adapted to slide on said track and being integral with the mobile notched element associated with said fixed notched element, so that the elastic element ensures both the function of elastically spacing said notched elements and guiding said notched elements with respect to one another.

2. Steering column according to claim 1, wherein said track is disposed along a flat surface and is bordered by at least one edge slanting with respect to said flat surface, thus constituting a guiding surface.

3. Steering column according to claim 1, wherein said mobile notched element comprises at least one recess and the elastic means comprises a tongue adapted to be inserted in said recess, the insertion making it possible to render integral the mobile notched element with the elastic means and to provide it with an accurate positioning with respect to said fixed notched element.

4. Steering column according to claim 1, including means for positioning in rotation the fixed notched elements with respect to the elastic means, said at least one mobile notched element comprising at least one track extending in a direction of movement of the mobile portion with respect to the fixed portion, said elastic means comprising at least one bracket adapted to slide on said tack and the guiding and locking system comprising means for supporting said mobile notched element against the elastic means in the unlocked position, so that the elastic means fulfills both the function of elastically spacing said mobile notched element from the associated fixed notched element and of guiding said notched elements with respect to one another.

5. Steering column according to claim 1, wherein the fixing means include a rod extending in a direction transverse to the column axis by passing through openings of the fixed and mobile portions, tightening members being disposed at each of the extremities of the rod and making it possible, when actuated, to tighten the brackets of the fixed portion against the adjacent brackets of the mobile portion.

6. Steering column according to claim 5, wherein the openings of the fixed portion have an elongated shape, the rod sliding in said openings in the unlocked position, thus driving the mobile portion, and being immobilized in the locked position corresponding to intermeshing of the notched elements.

7. Steering column according to claim 5, wherein said at least one mobile notched element is fixed to one of the extremities of the rod, the corresponding fixed notched element and bracket of the fixed portion being inserted between said mobile notched element and one of the brackets of the mobile portion.

8. Steering column according to claim 7, wherein the rod is a screw and the tightening members comprise a nut, said nut cooperating with the mobile notched element, with an antifriction means interposed therebetween.

9. Steering column according to claim 8, wherein the antifriction means is a washer formed of or coated with an antifriction material.

10. Steering column according to claim 5, wherein the tightening members comprise a cam, a counter-cam and an operating lever, disposed at one of the two extremities of the rod, the notched elements being disposed at the other extremity, the cam and counter-cam being adapted to be made to cooperate under the action of the operating level so as to make the column move from the unlocked position to the locked position and vice versa.

11. Steering column according to claim 1, including blocks inserted between the adjacent brackets of the fixed and mobile portions.

* * * * *